April 29, 1952     D. BELCHER ET AL     2,594,849
APPARATUS FOR MANUFACTURING VALVE BAGS
Filed April 15, 1949     6 Sheets-Sheet 1

Daniel Belcher,
Russell J. Williams,
James E. Voege,
Inventors,
Haynes and Koenig,
Attorneys.

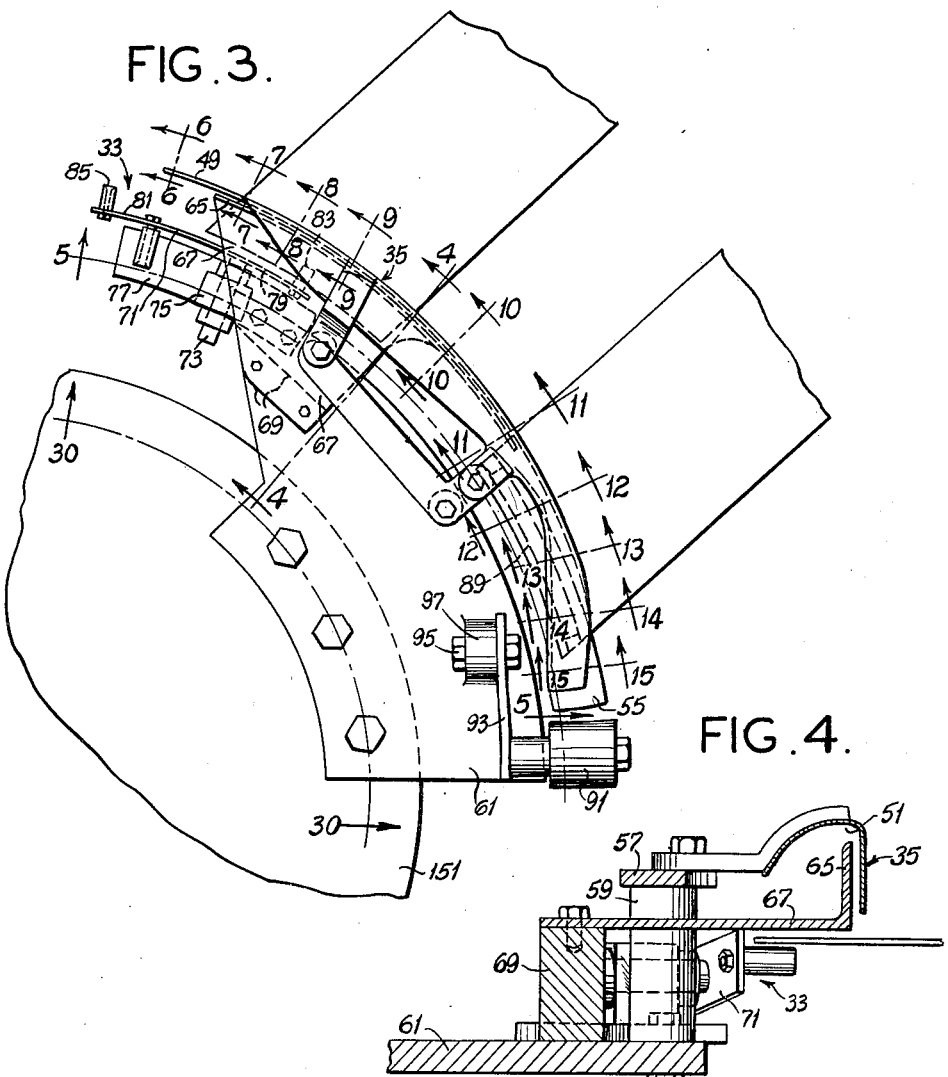
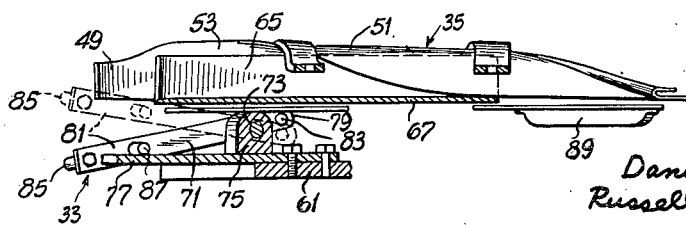

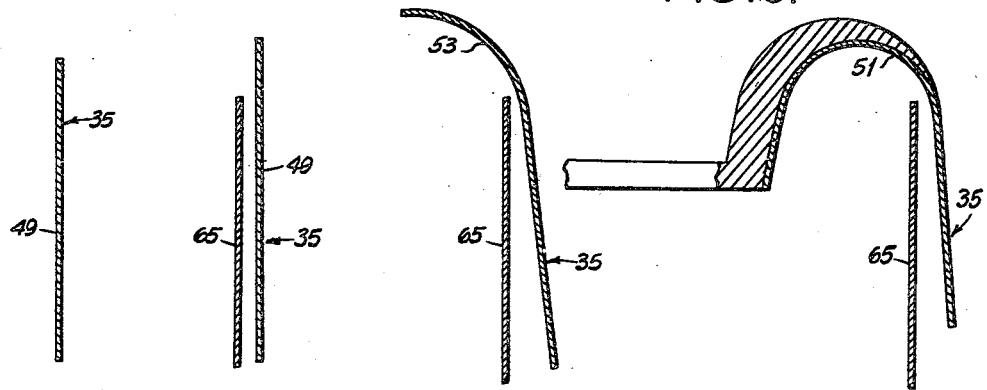
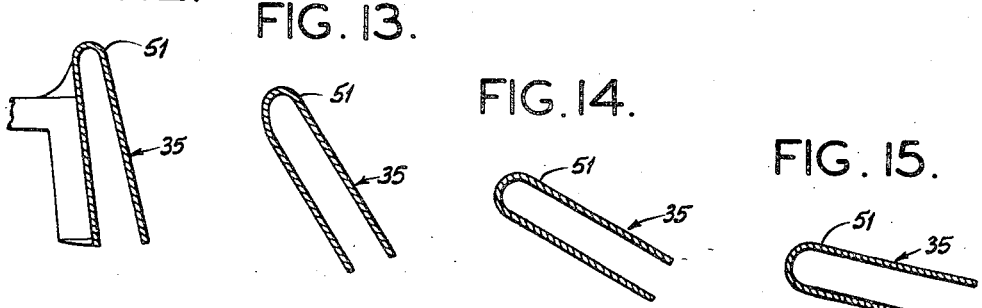

April 29, 1952  D. BELCHER ET AL  2,594,849
APPARATUS FOR MANUFACTURING VALVE BAGS
Filed April 15, 1949  6 Sheets-Sheet 4

Daniel Belcher,
Russell J. Williams,
James E. Voege,
Inventors,
Haynes and Koenig,
Attorneys.

April 29, 1952  D. BELCHER ET AL  2,594,849
APPARATUS FOR MANUFACTURING VALVE BAGS
Filed April 15, 1949  6 Sheets-Sheet 5

Daniel Belcher,
Russell J. Williams,
James E. Voege,
Inventors,
Haynes and Koenig,
Attorneys.

April 29, 1952    D. BELCHER ET AL    2,594,849
APPARATUS FOR MANUFACTURING VALVE BAGS
Filed April 15, 1949    6 Sheets-Sheet 6

Daniel Belcher,
Russell J. Williams,
James E. Voege,
Inventors,
Haynes and Koenig,
Attorneys.

Patented Apr. 29, 1952

2,594,849

UNITED STATES PATENT OFFICE 2,594,849

APPARATUS FOR MANUFACTURING VALVE BAGS

Daniel Belcher, Minneapolis, Minn., Russell J. Williams, Richmond Heights, Mo., and James E. Voege, Alton, Ill., assignors to Bemis Bro. Bag Company, St. Louis, Mo., a corporation of Missouri Application April 15, 1949, Serial No. 87,762

5 Claims. (Cl. 93—8)

This invention relates to apparatus for manufacturing valve bags and, more particularly, to apparatus for the continuous production of valve bag bodies of the type having a valve sleeve affixed to a corner by adhesive.

This invention involves an improvement upon the apparatus disclosed in our copending application entitled Apparatus For Manufacturing Valve Bags, Serial No. 756,998, filed June 25, 1947, now matured into Patent No. 2,527,295, dated October 24, 1950, wherein we have disclosed an apparatus for continuously assembling valve sleeves with bag bodies and stitching the sleeves to the bag bodies. Among the several objects of the invention may be noted the provision of apparatus for continuously assembling valve sleeves with bag bodies and adhering rather than stitching the sleeves to the bag bodies; and the provision of mechanism for carrying out the adhering operation which takes the place of the stitching mechanism in the prior apparatus, the latter otherwise being the same or substantially the same. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

Inasmuch as this invention involves an improvement, in accordance with rule 71c we have confined the description to the specific improvement and to such parts of the prior apparatus as are necessary for an understanding as to how the improvement is applied to the prior apparatus. All other details of the prior apparatus will be found in our aforesaid patent.

In the accompanying drawings, in which one of various possible embodiments of the invention is illustrated:

Fig. 3 is an enlarged plan view of a folder of the invention;

Fig. 4 is an enlarged vertical section taken substantially on line 4—4 of Fig. 3;

Fig. 5 is a vertical section taken substantially on line 5—5 of Fig. 3;

Figs. 6–15 are enlarged transverse vertical sections through the folder taken on lines 6—6 to 15—15 of Fig. 3;

Similar reference characters indicate corresponding parts throughout the several views of the drawings.

Figure 27:
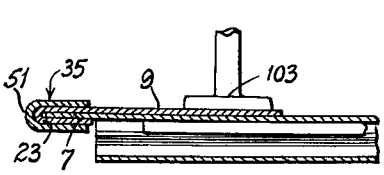
Figure 28:
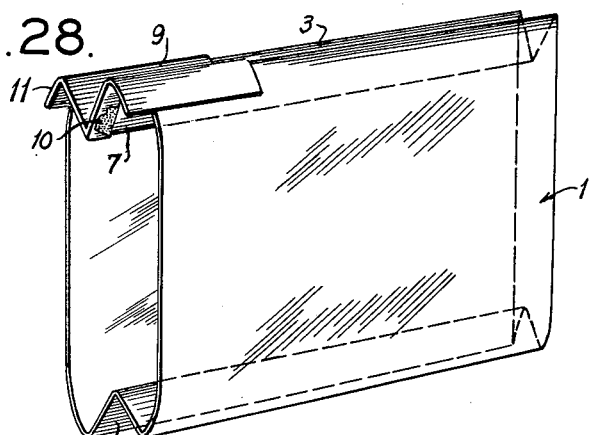
Fig. 28 is a perspective of a bag body with a valve sleeve attached thereto as produced by the apparatus of this invention.

The ultimate function of the apparatus of this invention is the automatic, high-speed production of valve bag bodies such as illustrated in Fig. 28. This valve bag body comprises a bag body 1 in the form of a flattened tube of sheet material, such as paper, fabric or the like, having infolded gusset sides 3 and 5. Extending outward from a corner of the bag body, specifically the corner at the mouth end of the side 3, is an extension or tongue 7. This extension or tongue is commonly referred to in the art as a "valve notch." A valve sleeve 9 is adhesively affixed to the extension 7 in the manner best shown in Fig. 27. The sleeve is simply a generally rectangular piece of sheet material, preferably paper, one end of which is folded around the end edge of the extension 7, the folded portion being adhesively secured to the inside face of the extension 7 as indicated at 10. The line on which the sleeve is folded around the end edge of the extension 7 is designated 11.

Figure 29:
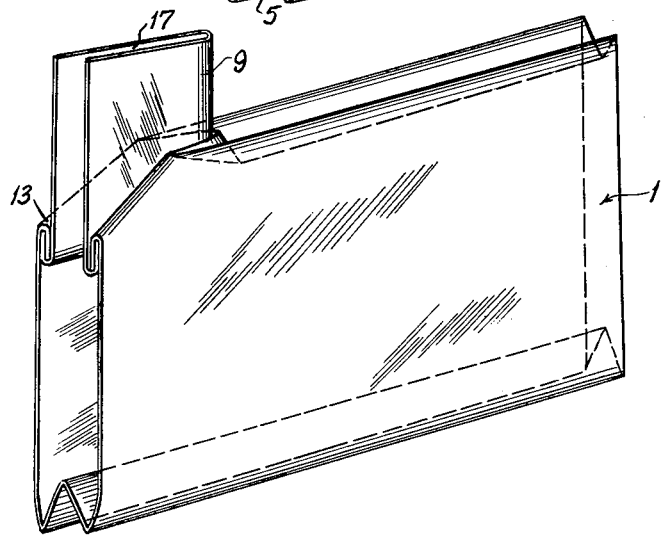
Fig. 29 is a perspective illustrating how the bag body of Fig. 28 is made into a valve bag; and, Fig. 30 is a vertical section taken substantially on line 30—30 of Fig. 3.

By way of explanation, the valve bag body is ultimately formed into a valve bag in the manner illustrated in Fig. 29 by tucking in the aforesaid corner of the bag body to form a valve flap 13 extending into the bag body with the valve sleeve 9 forming what is known in the art as a "tuck-in sleeve" extending outward beyond the side of the bag body. The ends of the bag body subsequently are closed as by stitched seams or the equivalent (not shown), thus forming a completed valve bag having an inlet 17 between the sides of the folded valve sleeve 9 and valve flap. This bag is adapted to be filled with comminuted or pulverulent material by inserting a filling spout through the inlet. When the bag is filled, a closure for the inlet is provided by crumpling up or folding the tuck-in sleeve and tucking it into the space between the sides of the valve flap 13.

Figure 1:
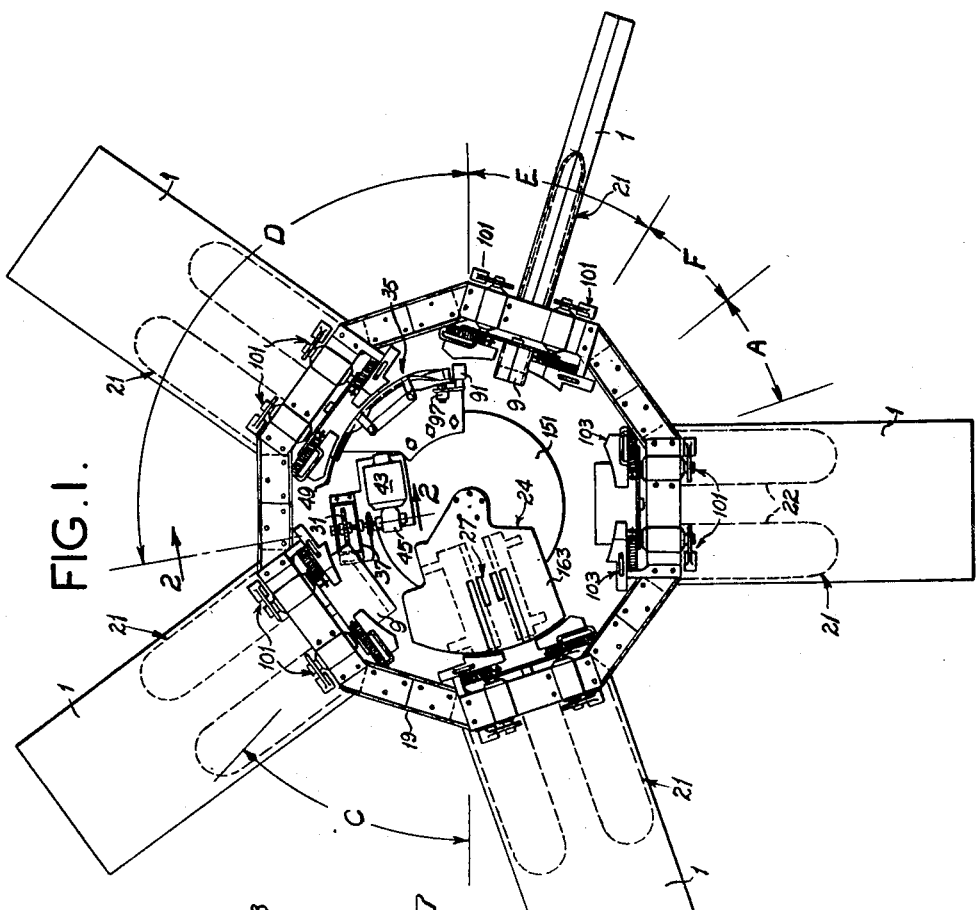
Fig. 1 is a plan view illustrating the present invention and how it is applied to the above-mentioned prior apparatus.

Generally, and referring more particularly to Fig. 1, the apparatus of this invention includes a conveyor 19 in the form of a generally annular carriage which rotates continuously about a central vertical axis. Extending generally radially outward from the carriage 19 are a plurality of bag-spreading devices, each designated 21. Each one of these devices comprises a pair of blades 22 pivotally mounted on the carriage in such manner that they may be collapsed to receive a bag body and expanded to spread it. As illustrated herein, there are five bag-spreading devices, spaced uniformly around the carriage, but it will be understood, as in our said prior patent, that this number is arbitrary and that there may be more or less than five such devices.

Each pair of blades is adapted to have a bag body 1 placed thereon as it rotates through a zone A (Fig. 1) and to carry the bag body successively through a number of zones wherein different operations are automatically performed. As the blades 22 rotate through zone A, they are maintained in collapsed position wherein they are vertical and closely adjacent one another. This enables an operator readily to slip a bag body 1 on each pair of blades since it is merely necessary to open up the flattened tubular bag body sufficiently to permit entry of the blades therein. This operation is illustrated in Fig. 16.

Figure 16:
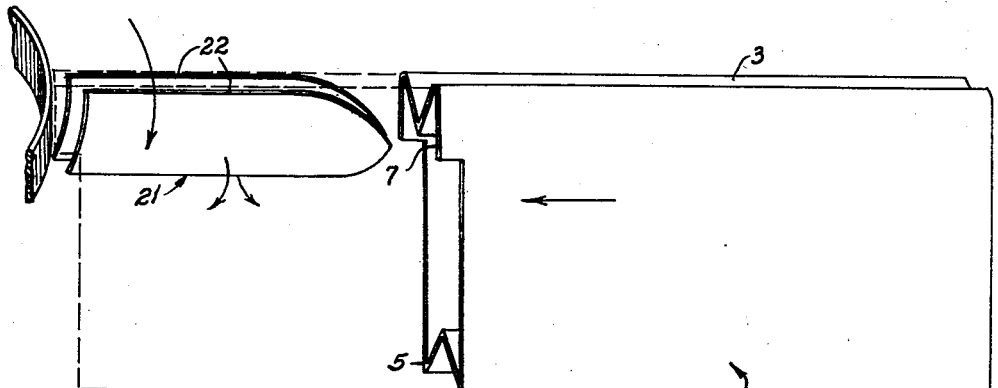
Figs. 16–23 are diagrammatic perspective views illustrating consecutive steps in the operation of the apparatus.
Figure 17:
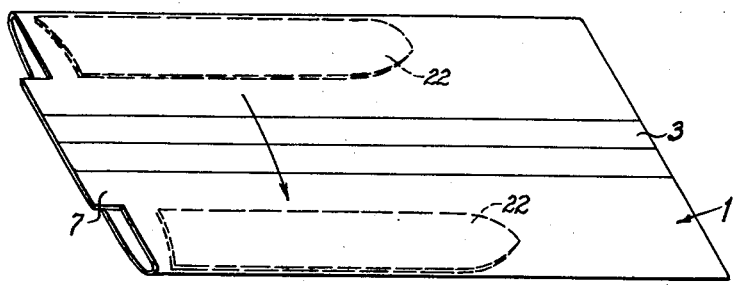

As any pair of blades carrying a bag body rotates with carriage 19 out of zone A, the blades are moved from the collapsed position of Fig. 16 to the expanded position of Fig. 17, wherein they are horizontally coplanar and spread apart, thereby spreading the bag horizontally and spreading flat its gusset side 3. Also, the spread bag body is clamped upon the blades by outside and inside clamping devices 101 and 103 (Fig. 1) which engage the upper surfaces of the bag body resting upon the blades to hold it firmly in position thereon.

The creasing of the bag body described in our aforesaid patent is omitted, the creasing device being removed. Consequently, we have not illustrated the operating zone B illustrated in said application.

Figure 18:
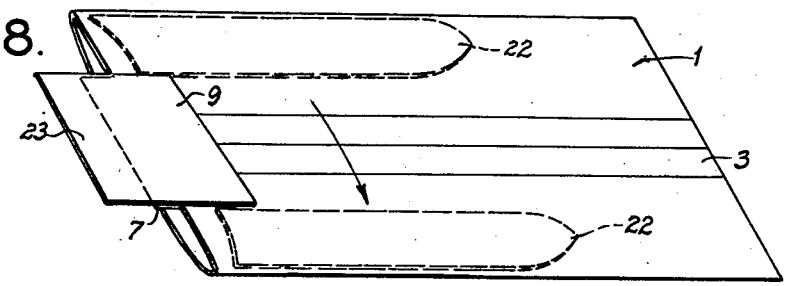

The blades subsequently carry the spread bag body through an operating zone C wherein a valve sleeve 9 is delivered upon the upper surface of the bag body with the sleeve projecting beyond the outer edge of the bag body extension 7 as indicated at 23. The resultant valve sleeve and bag body assembly is illustrated in Fig. 18. The sleeve is delivered to the bag body by a delivery means 27 carried by an oscillating turret 24 (Fig. 1). During the delivery of the sleeve, the inside clamping devices 103 are released to permit the sleeve to be fed outward over the upper surface of the bag body. After the sleeve has been delivered, said clamping devices are returned to clamping position firmly to clamp the sleeve upon the bag body (see Figs. 24–27).

Figure 19:
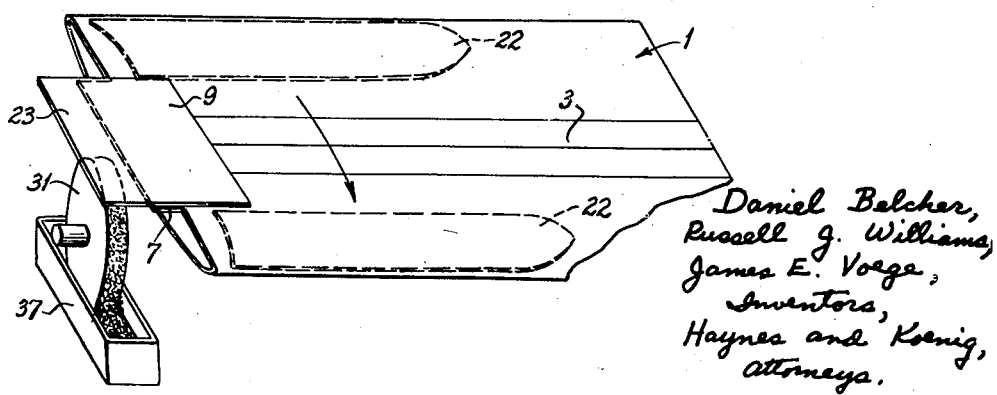
Figure 20:
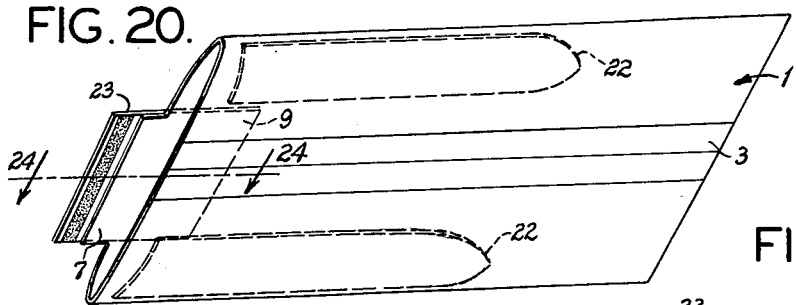
Figure 21:
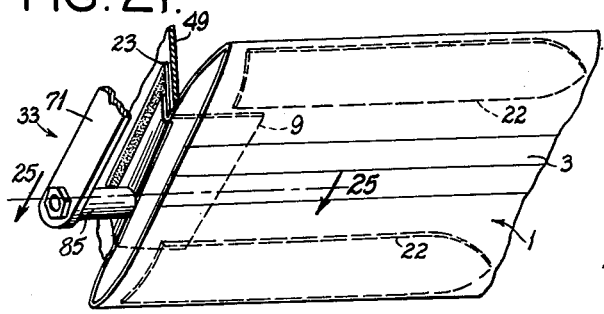
Figure 22:
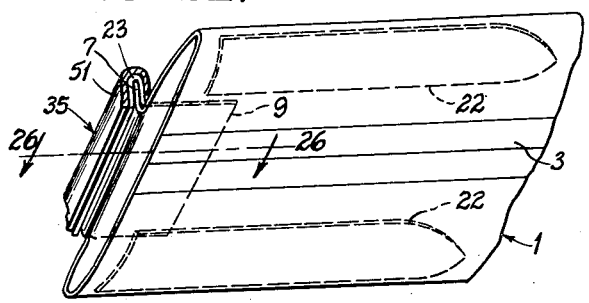
Figure 23:
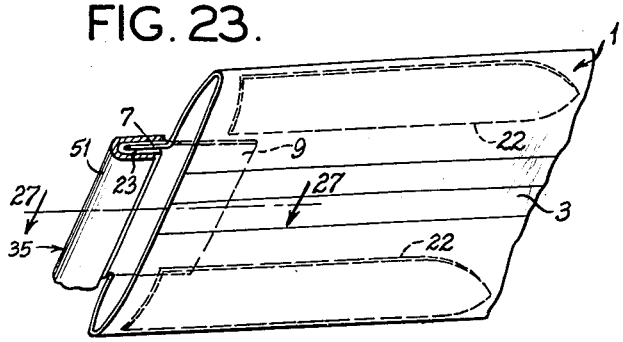
Figure 24:
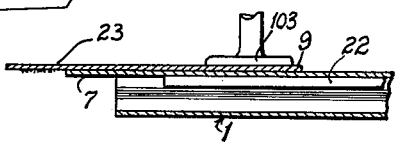
Figs. 24–27 are vertical diagrammatic sections taken on lines 24—24 to 27—27 of Figs. 20–23, respectively.
Figure 25:
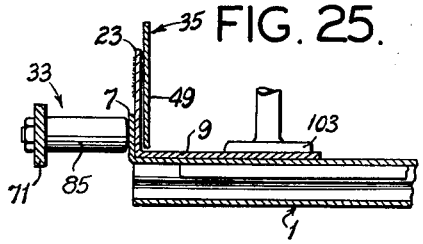
Figure 26:
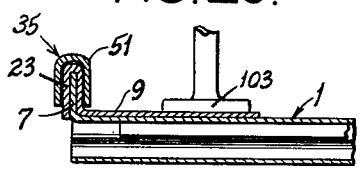

The blades thereupon carry the assembled valve sleeve and bag body through operating zone D wherein several operations are performed. As the assembled valve sleeve and bag body enter zone D, paste is applied to the bottom side of the projecting portion 23 of the sleeve (i. e., the side of the projecting portion which faces the bag body) by a paste wheel 31, as illustrated in Fig. 19. Then the valve notch 7 and the outer end of the sleeve (including the portion of the sleeve extending over the valve notch and projecting beyond the valve notch) are bent to extend upward, generally perpendicular to the plane of the bag body, by mechanism generally designated 33, so that they are properly positioned to enter a folder 35 (see Figs. 21 and 25). As the bent-up valve notch and the bent-up portion of the sleeve travel through the folder, the projecting portion 23 of the sleeve is folded around the edge of the valve notch to cause the projecting portion of the sleeve to become adhered to the inside face of the valve notch (see Figs. 22 and 26). The folder is so shaped that before the sleeve and valve notch travel out of the folder they are bent back to horizontal position (Figs. 23 and 27).

The blades then carry the bag body 1 with valve sleeve 9 pasted thereto through operating zone E, wherein the blades are moved back to collapsed position to restore the tubular bag body to its original form with sides 3 and 5 folded in. Here the sleeve becomes folded in with the infolded gusset side 3, as illustrated in Fig. 28.

Finally, the blades carry the bag through operating zone F, where the completed valve bag body is manually stripped from the blades. The collapsed blades then re-enter zone A, where another bag body is placed thereon and the entire series of operations repeated. It will be understood that, since there are five pairs of blades, five bag bodies are in the process of having valve sleeves applied thereto during each revolution of carriage 19.

The annular carriage 19, the blades 22 and their operating mechanism, the clamping devices 101 and 103, the oscillating turret 27 and the valve sleeve delivery means 24 are disclosed in detail in our aforesaid patent. They function in exactly the same manner in the apparatus of this invention as in the prior apparatus, except that the valve sleeve delivery means 24 is adjusted to feed each valve sleeve to a position wherein it projects beyond the outer edge of the valve notch 7, rather than to a position wherein the end of the sleeve is coincidental with the outer edge of the valve notch as in the prior apparatus. Our aforesaid prior patent illustrates suitable means for adjusting the valve sleeve delivery mechanism to feed the sleeves in the manner herein desired.

Figure 2:
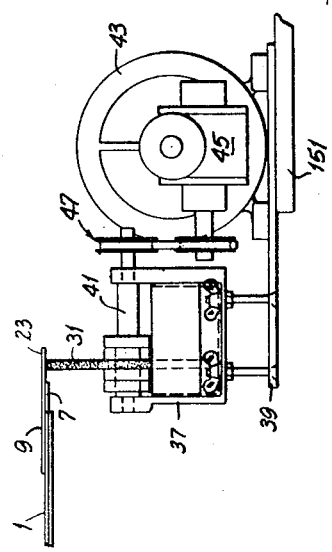
Fig. 2 is an enlarged vertical section taken substantially on line 2—2 of Fig. 1 illustrating a paste-applying mechanism of the invention.

After any bag-spreading device 21 has completed its travel through operating zone C, the spread bag body thereon has a valve sleeve 9 assembled therewith in the manner illustrated in Fig. 18. The valve sleeve is clamped in assembled relation with the bag body by both the outside and inside clamps 101 and 103. The paste wheel 31 is mounted in fixed relation to the rotary carriage 19 to apply paste to the bottom side of the projecting portion of the valve sleeve after the bag-spreading device has carried the bag and sleeve thereon out of the zone C. The wheel rotates on a horizontal axis which extends radially with respect to the axis of the carriage in a paste pot 37 (Figs. 1 and 2). The latter is adjustably mounted as to elevation on a horizontal platform 39 carried by a horizontal mechanism plate 151 of the apparatus. This mechanism plate will be found in the disclosure of our aforesaid patent bearing the same reference character. The wheel is fixed on a shaft 41 journalled in the sides of the paste pot. The wheel is axially positioned on the shaft 41 (radially positioned with respect to the vertical axis of the carriage 19) to coincide with the arcuate path of travel of the portion of the valve sleeve 9 which projects beyond the valve notch 7 (see Fig. 1). The paste pot is adjusted in elevation so that the upper edge of the wheel will engage the bottom side of the projecting portion of the valve sleeve to apply paste thereto (see Fig. 2). The paste wheel is continuously driven by means of an electric motor 43 mounted on the platform 39 driving the shaft 41 through a speed reducer 45 and a belt and pulley drive 47.

Figure 30:
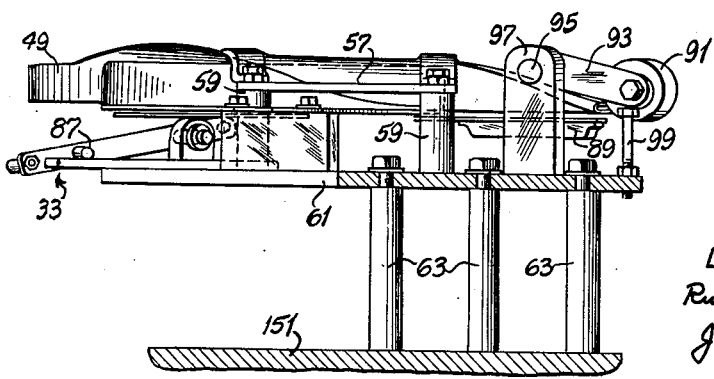

The folder 35 is mounted in fixed position relative to the rotary carriage 19 and is so located and shaped as to cause the projecting portion of the valve sleeve to be folded over the outer edge of the valve notch in the manner previously described. It is formed of sheet metal and has the progressive cross sections illustrated in Figs. 6–15. In plan it is curved to follow the arcuate path of travel of the valve notch and sleeve (see Figs. 1 and 3). It will be seen from the drawings that the entrance end of the folder consists of a vertical section 49, curved on a radius centered substantially in the vertical axis of the rotary carriage 19 and slightly greater than the mean radius of the mouth edge of the bag body, so that both the valve notch and the valve sleeve extend inward under the lower edge of the vertical section 49 (see Figs. 21 and 25). The vertical section develops into a channel section 51 through a transition section 53. The channel section 51 becomes progressively deeper and narrower in the direction of travel of the valve notch and valve sleeve and is also twisted so as to develop progressively from a generally vertical form opening downward to a generally horizontal form opening outward, that is, opening away from the center of the carriage 19 (see Figs. 9–15). At the exit end of the folder, the bottom wall of the channel is extended as indicated at 55 (Fig. 3). The radially outer side of the folder generally follows the arc of curvature of the vertical-wall entering section 49 of the folder (see Figs. 1 and 3). The folder is carried by a bracket 57 mounted on posts 59 which extend upward from a supporting platform 61. This platform is supported at the proper elevation by posts 63 which extend upward from the mechanism plate 151 (Fig. 30). The folder is located with its entering section 49 forward of the paste wheel 33 in the direction of travel of the bag-spreaders 21 and in such a horizontal plane that the lower edge of the entering section 49 is slightly above the valve sleeve on a spread bag body (see Fig. 25) and the exit end of the channel section 51 is generally in the plane of the expanded bag-spreading blades 22 (see Fig. 27). A vertical arcuate guide 65 extends through the folder from a point forward of the rearward end of the entering section 49 of the folder, but rearward of the beginning of the transition section 53 of the folder, to the point where the folder begins to twist away from vertical. The guide 65 is conveniently formed as an arcuate, upwardly extending vertical flange on the outer edge of a plate 67 mounted on and extending outward from a supporting block 69 on the platform 61. The guide 65 reaches upward into the folder, radially inside the entering section 49 of the folder, and extends arcuately parallel to and slightly spaced from the outside wall of the folder. The plate 67 is located in a horizontal plane above the path of the blades 22 with the upper edge of the guide slightly below the upper edge of the upturned valve notch 7.

The mechanism 33 for bending up the valve notch 7 and the projecting portion 23 of the valve sleeve 9 comprises a curved lever 71 pivoted for rocking movement about a horizontal axis which extends generally radially with respect to the axis of the rotary carriage 19. The lever 71 is curved generally on an arc centered in the axis of the carriage and on a radius such that it is located inside of the entrance section 49 of the folder. It has a pivot 73 intermediate its ends in a block 75 mounted on a plate 77 carried by the platform 61. The arm 79 of the lever which extends forward in the direction of travel of the bag spreaders from the pivot is shorter than the arm 81 of the lever which extends rearward so that the lever is gravity-biased to rock counterclockwise as viewed in Fig. 5. On the forward end of the lever is a cam follower 83 and on its rearward end is a finger 85. These extend radially outward at the ends of the lever. The arm 81 of the lever is of such length that the finger 85 is located rearward of the rearward end of the vertical entering section 49 of the folder. The lever carries a stop 87 engageable with the plate 77 to determine a retracted position of the lever wherein the finger 85 is below the vertical entering section 49 of the folder and wherein the cam follower 83 is in a relatively raised position just under the path of the blades 22. On the bottom of each one of the leading blades of the bag spreading devices 21 is a cam 89 positioned to engage the cam follower 83 as the leading blade travels over the follower and to rock the lever clockwise to the position illustrated in dotted lines in Fig. 5 so as to move the finger 85 upward, thereby to bend up the valve notch 7 and sleeve 9 (see Fig. 21). When the cam rides off the cam follower, the lever returns to its retracted position under its gravity bias.

A presser roll 91 may be provided to bear on the creased portion of the valve sleeve as it emerges from the folder to make the crease sharper. This roll is illustrated as carried on the end of an arm 93 pivoted at 95 to a block 97 mounted on the platform 61 so that its weight is brought to bear on the crease. A stop 99 is provided to prevent the roll from swinging too far downward when the work travels out from under the roll.

Operation is as follows:

As the carriage 19 rotates, an operator stationed at zone A takes a bag body 1 and thrusts it on the collapsed blades 22 of the bag spreader 21 travelling through the zone, with the gusset side 3 uppermost and the valve notch 7 forward, as in the operation of the apparatus described in our aforesaid patent. As the bag spreader travels out of zone A the blades expand and spread flat the valve notch corner of the bag body (Fig. 17). The spread bag body subsequently travels through zone C wherein a valve sleeve 9 is delivered upon the bag body to the position illustrated in Fig. 18, wherein the sleeve projects beyond the valve notch as indicated at 23. Also, the sleeve is clamped by the clamping devices 101 and 103, as in our aforesaid patent.

As the spread bag body and sleeve then travel through zone D, the projecting portion 23 of the sleeve is carried over the paste wheel 31 in wiping engagement therewith to receive paste on its lower surface. Subsequently, when the valve notch and sleeve, in the course of their rotation, reach the vertical entering section 49 of the folder, the cam on the leading blade 22 of the bag spreader engages the cam follower 83 on the forward end of the lever 71. This rocks the lever clockwise as viewed in Figs. 5 and 30 thereby moving the finger upward to bend up the valve sleeve and the valve notch to a vertical position against the folder section 49 (see Figs. 21 and 25).

The bent-up valve notch and portion 23 of the sleeve then enter the space between the guide 65 and the folder section 49 and, as they travel forward, the transition section 53 of the folder causes the portion 23 of the sleeve to start to fold over around the upper edge of the guide. This folding over of the portion 23 continues until, as the folded-over portion 23 travels away from the end of the guide 65, it is caused to be pressed against the upturned valve notch by the channel section 51 of the folder, which becomes narrower in the direction of travel of the bag spreaders and is so dimensioned as to effect such pressing action (see Figs. 22 and 26). This causes the projecting portion 23 of the sleeve to become adhered to the under surface of the valve notch 7. Then, as the upturned valve notch and the portion of the sleeve which enfolds the valve notch travel through the ensuing twist of the folder, they return to horizontal positions (Figs. 23 and 27). As the valve notch and sleeve travel out of the folder, the presser roll 91 bears down on the crease where the sleeve is folded around the end of the valve notch to make it sharper.

The bag body and sleeve assembly then enter zone E where the bag spreader blades 22 return to collapsed position, the gusset sides 3 and 5 refold, and the valve sleeve 9 folds in with the gusset side 3. The inside and outside clamps are released, as in the prior apparatus.

Finally the bag spreader carrying the completed valve bag body illustrated in Fig. 28 enters zone F, where an operator strips the bag body from the bag spreader. It then re-enters zone A, where another bag body is placed thereon, and the entire series of operations repeated in a continuous manner.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. Apparatus for manufacturing valve bags comprising a conveyor including a bag-spreading device adapted to receive and carry a bag body having a valve notch and to spread flat the valve notch corner thereof, said conveyor being adapted to move a spread bag body carried by said device in a predetermined path, means for delivering a valve sleeve to the spread valve notch corner of a spread bag body carried by said device as it travels through a portion of said path with the sleeve projecting beyond the valve notch, means for applying adhesive to the side of the projecting portion of the sleeve which faces the bag body as the sleeve travels with the bag body through a successive portion of said path, means for bending the valve notch and the portion of the sleeve extending over the valve notch and projecting beyond the valve notch to extend generally perpendicular to the plane of the spread bag body as the sleeve travels with the bag body through a further successive portion of said path, and means for folding the projecting end of the sleeve around the edge of the valve notch to cause the sleeve to become adhered to the inside face of the valve notch as the sleeve and bag body travel through a further successive portion of said path.

2. Apparatus for manufacturing valve bags comprising a carriage rotary on a vertical axis, a bag spreader extending radially outward from the carriage and movable therewith in a circular path in a horizontal plane, said bag spreader being adapted to receive a bag body having a valve notch and to spread its valve notch corner horizontally flat, means for delivering a valve sleeve upon the spread valve notch corner as the bag spreader travels through a portion of said path with the sleeve projecting beyond the valve notch, a paste applicator mounted in fixed relation to the carriage in position to apply paste to the lower surface of the projecting portion of the sleeve as the bag spreader travels through a successive portion of said path, and a folder mounted in fixed relation to the carriage shaped and positioned to cause the projecting portion of the sleeve to be folded around the end of the valve notch and thereby to become pasted to the valve notch as the bag spreader travels through a further successive portion of said path.

3. Apparatus for manufacturing valve bags as set forth in claim 2 wherein the paste applicator comprises a paste pot and a continuously driven paste wheel rotary in the paste pot on an axis which extends generally radially with respect to the axis of the carriage.

4. Apparatus for manufacturing valve bags as set forth in claim 2 wherein the folder has a generally vertical channel section which develops into a generally horizontal channel section in the direction of travel of the bag spreader, and wherein the apparatus includes mechanism for bending the valve notch and the projecting portion of the valve sleeve to extend generally vertically for entry into the folder.

5. Apparatus for manufacturing valve bags as set forth in claim 2 wherein the folder is curved on an arc centered substantially in the axis of the carriage and has a generally vertical and downwardly opening channel section which develops into a generally horizontal and outwardly opening channel section in the direction of travel of the bag spreader, and wherein the apparatus includes mechanism comprising a pivoted lever and a cam on the bag spreader for actuating the lever to bend up the valve notch and the projecting portion of the valve sleeve prior to reaching the vertical channel section of the folder to position them for entry into the folder.

DANIEL BELCHER.
RUSSELL J. WILLIAMS.
JAMES E. VOEGE.

REFERENCES CITED

The following references are of record in the file of this patent:

UNITED STATES PATENTS

| Number | Name | Date |
|---|---|---|
| 1,624,885 | Bergstein et al. | Apr. 12, 1927 |
| 2,245,348 | Laver | June 10, 1941 |
| 2,260,191 | Orr | Oct. 21, 1941 |
| 2,387,274 | Lee | Oct. 23, 1945 |
| 2,442,431 | Peters | June 1, 1948 |